COMBINED THICK AND THIN FILM CIRCUITS

INVENTOR
H. ABRAMS
BY [signature]
ATTORNEY

COMBINED THICK AND THIN FILM CIRCUITS

Filed Oct. 6, 1966 3 Sheets-Sheet 2

Feb. 2, 1971 H. ABRAMS 3,560,256
COMBINED THICK AND THIN FILM CIRCUITS
Filed Oct. 6, 1966 3 Sheets-Sheet 3
FIG.-10
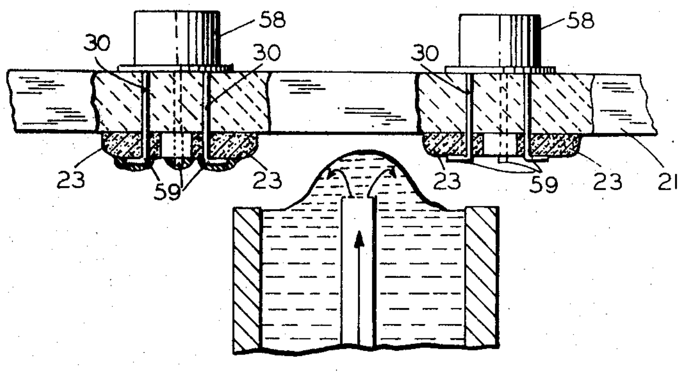
FIG.-11A
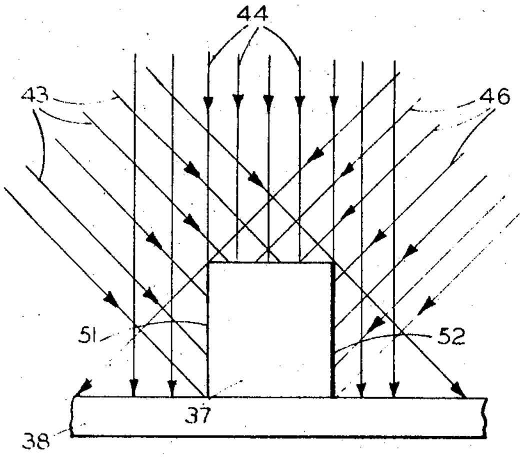
FIG.-11B
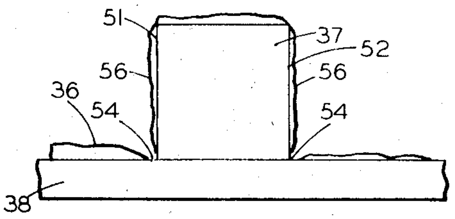
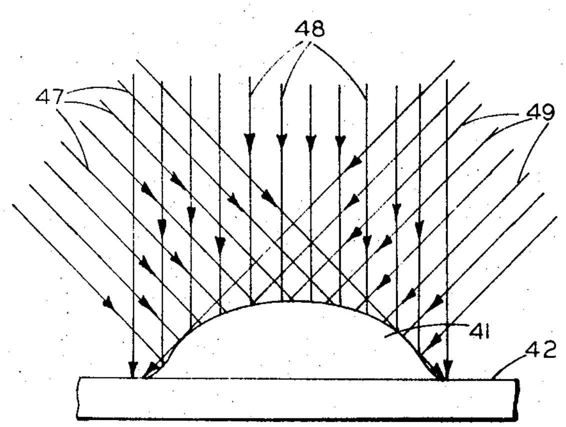
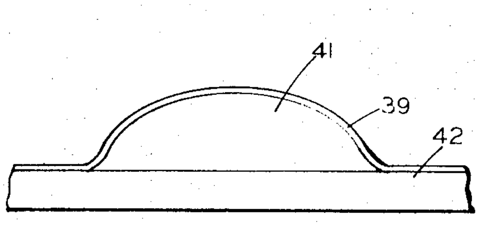
FIG.-12A
FIG.-12B 3,560,256

COMBINED THICK AND THIN FILM CIRCUITS

Halle Abrams, Allentown, Pa., assignor to Western Electric Company, Incorporated, New York, N.Y., a corporation of New York Filed Oct. 6, 1966, Ser. No. 584,894
Int. Cl. H05k *1/04, 3/16*
U.S. Cl. 117—212 25 Claims

ABSTRACT OF THE DISCLOSURE

A thick and thin-film circuit includes at least three glazed conductors, a glazed dielectric formed over one of the conductors, and a thin-film crossover resistor formed over the dielectric and connected to the other conductors. The resistor is formed from a film which is resistant to most atmospheres and solutions which would attack the conductors and adversely affect their electrical and physical integrity. A portion of this film is left over the conductors to protect them from such atmospheres and solutions. Where the film can be bonded to the substrate with a bond stronger than that between the conductors and the substrate, as is the case of sputtered tantalum nitride, another portion of the film is left on the substrate to extend over the conductors to form tabs on opposite sides of such conductors to thereby more firmly secure the conductors to the substrate.

This invention relates generally to the field of microelectronics. More particularly, this invention relates to combined thick and thin film circuits and to methods of fabricating such circuits. Accordingly, the general objects of this invention are to provide new and improved circuits and methods of manufacture of such character.

The trend in recent years in the electronics industry toward microminiaturization had led to the evolution of film-type circuits. These circuits, which possess a higher volumetric efficiency or packing density than conventional circuits or printed circuits with conventional components, generally include a film-type conductor network and a plurality of film-type, passive, electrical components, such as resistors and capacitors, formed in situ on a common substrate. The circuits are generally categorized as either "thick film" or "thin film," depending upon the thickness of their films, the compositions thereof and/or their methods of fabrication.

In thick-film circuits, sometimes termed "cermet" or "glazed" circuits, the components and the conductor network are composed of thick-films of metallic particles dispersed in a matrix, such as glass, which functions to bond the particles to a supporting substrate. The circuits are formed by selectively applying (e.g., by screening) a frit of the film material onto the substrate, which is subsequently fired to glaze the film material and bond it to the substrate. Typically, the thicknesses of the films range from .2 mil to 10 mils.

In thin-film circuits, the components and the conductor network are composed of thin films of the order of 300 A. to 30,000 A. thick, formed by a vacuum deposition technique, such as sputtering or evaporation. The films may be deposited through suitable masks to form the desired circuit pattern, or as area films which are then selectively etched to form the desired circuit pattern.

Generally, it is significantly less expensive to manufacture thick-film circuits than thin-film circuits. Primarily, this is due to the relative speed and simplicity of the screening and firing steps employed in thick-film circuit fabrication, compared with the deposition and etching steps ordinarily employed in thin-film circuit fabrication. Thin-film passive components, on the other hand, are generally recognized as being more reliable and precise than thick-film types. While more precise conductors are also obtainable with thin-film techniques, these are not ordinarily as critical as the components and, accordingly, thin-film conductor networks offer no significant technical advantage in this regard over thick-film conductor networks. To the contrary, the greater thicknesses of the thick-film conductors make them more amenable to certain types of external lead attachment techniques.

The present invention obtains the benefits of both technologies by providing film-type circuits which employ thin-film electrical components and thick-film conductor networks.

Another trend in the industry has been toward increasing the packing density of film-type circuits by the use of crossovers. Usually, these have taken the form of conductors crossing over other conductors, with the crossing conductors being separated by a dielectric medium, such as glaze for thick-film circuits and silicon monoxide for thin-film circuits. While this type of crossover has met with some success in increasing the packing density of the circuits, it has not been found to be the complete answer. In order to effectively synthesize or convert certain types of circuits to single substrate, film types, it is necessary to employ crossover components (e.g., resistors) in addition to or in lieu of crossover conductors.

However, to employ this approach in thick-film circuitry necessitates avoidance or control of the problem of the crossover resistor settling into or merging with the underlying glaze dielectric during firing of the crossover resistor. Such an occurrence could result in an adverse change in the physical and electrical characteristics of both the crossover resistor and the crossover dielectric.

In thin-film technology, a different type of problem is presented: irregularities nad discontinuities in the crossover resistor film occasioned by a shadowing effect when the film is deposited over the crossover dielectric which, because of the way it has been formed, generally has a rectangular cross section. This problem is further complicated by the fact that the dielectric must be relatively thick in order to minimize capacitive coupling between the crossover resistor and the underlying conductor.

In accordance with one aspect of the present invention, these problems are obivated by employing a crossover resistor of the thin-film type with a thick-film crossover dielectric. Such a combination does not result in any adverse interaction between the resistor and the dielectric, thereby enabling tight control over the resistance (i.e., ohms per square) of the deposited film. Further, during the firing of the dielectric, wetting, surface tension and shrinkage cause the dielectric to assume a somewhat rounded cross section. This enables the subsequently deposited material to conform to the dielectric and form a strong, continuous film.

As noted above, the conductor networks are generally not critical. However, in applications where very highly conductive interconnections are required, it is necessary to use a very high conductivity metal, such as gold, as the sole conductive constituent of the condutcors. Since gold dissolves in almost all solders, a problem arises where it is desired to use soldering to attach external leads to a gold-glaze conductor network. One solution to this problem is to form the parts of the conductor network to which the leads are to be attached, termed "pads," of a solderable composition, such as a platinum-gold glaze. This would enable individual soldering of the leads, as by means of a soldering iron, for example. However, it would not, per se, permit the use of a mass soldering technique, such as wave soldering. Ordinarily, this would require an additional masking step to protect the gold conductors. The effect of such an additional step, however, would be to counteract the economic advantages of using a mass soldering technique.

The present invention, in accordance with another aspect thereof, solves this specific problem without requiring any additional step by employing the resistive film as a protective covering for the glazed gold conductors. The film, in this instance, would be formed of a material, such as tantalum and/or tantalum nitride, which does not dissolve in solder. The protection is achieved without any additional processing since the protective covering is formed at the same time as the resistors. For example, if the resistors are to be formed by deposition through a mask, the masking is such that the film is deposited over the conductors, as well as on the areas of the substrate where resistors are desired. Similarly, if the resistors are to be formed by depositing an area film which is then selectively etched, the etching is such that the film is not removed from the conductors. While this aspect of this invention has special utility in enabling mass soldering of circuits employing gold-glaze conductors, it should be apparent that its scope is not so limited. Thus, in any case where the resistive film is resistant to atmospheres or solutions which would attack the conductors, either during or after fabrication, this invention, in accordance with this aspect thereof, contemplates leaving the film on the conductors.

Where the film is bonded to the substrate with a bond stronger than that between the conductors and the substrate, as is the case for a sputtered film, this invention, in accordance with another aspect thereof, contemplates leaving the film on the conductors such that the film extends from opposite sides of each conductor onto the substrate. This results in the conductors being more firmly secured to the substrate and thereby adds to the strength and reliability of the circuits, particularly where they are to be subjected to severe environmental stresses in use.

The invention, as well as all its objects, advantages, features and aspects, will be more readily understood from the following detailed description thereof, when considered in conjunction with the appended drawings in which:

FIGS. 3–10 are a series of fragmentary sectional views illustrating various steps in a method of fabricating the circuit of FIG. 1, in accordance with certain principles of the invention;

Figure 1:
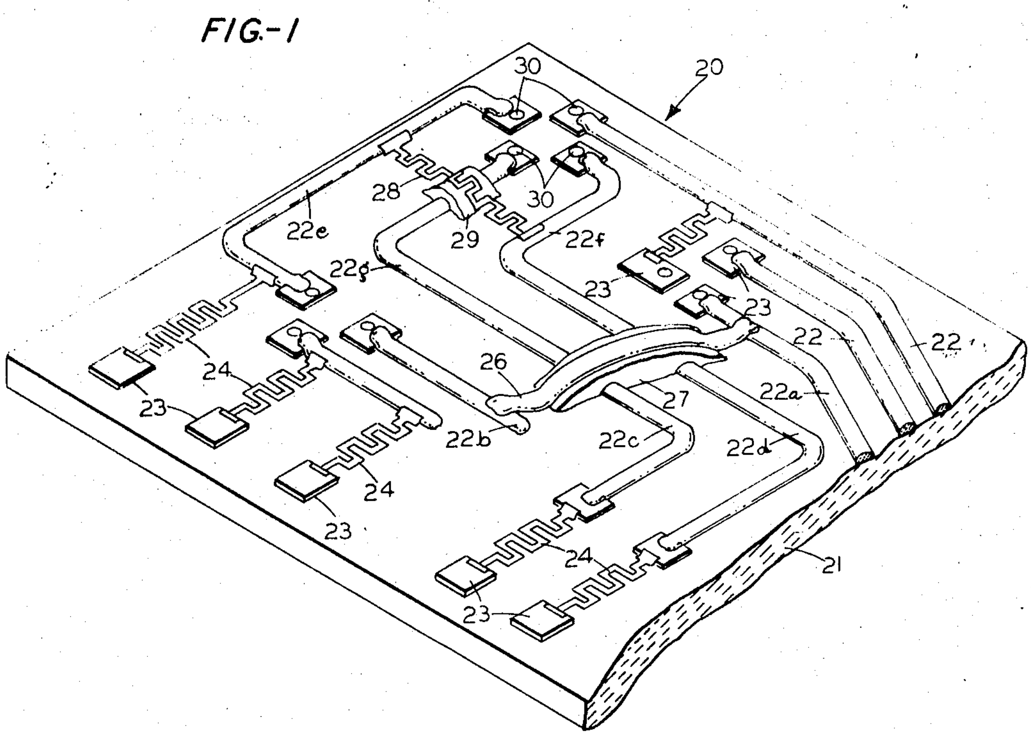
FIG. 1 is a perspective view of a portion of an illustrative combined thick and thin film circuit, embodying certain features and aspects of the invention.

FIGS. 11*a* and 11*b* illustrate the vacuum deposition of a thin film on a relatively thick, squared-off element; and FIGS. 12*a* and 12*b* illustrate the vacuum deposition of a thin film on a rounded element of the same thickness as the element of FIGS. 11*a* and 11*b*.

It should be understood that the vertical dimensions in the drawings are greatly exaggerated for the sake of clarity of illustration.

CIRCUIT CONFIGURATION AND COMPOSITION

Referring now to the drawings and particularly to FIG. 1, there is shown a portion of an illustrative, combined thick and thin film circuit 20 embodying certain features and aspects of the invention. The circuit 20 includes: an electrically nonconductive substrate 21; a thick-film conductor network formed on the substrate and including a plurality of thick-film conductors 22—22 and pads 23—23 to which external leads may be attached; and a plurality of thin-film resistors 24—24 formed on the substrate.

In addition, the circuit 20 includes a thick-film crossover conductor 26 which connects a pair of conductors 22*a* and 22*b*, while crossing over other conductors 22*c* and 22*d*. The conductor 26 is spaced and electrically insulated from the conductors 22*c* and 22*d* by a thick-film crossover dielectric 27.

The circuit 20 also includes a thin-film crossover resistor 28 which connects a pair of conductors 22*e* and 22*f*, while crossing over another conductor 22*g*. The resistor 28 is spaced and electrically insulated from the conductor 22*g* by a thick-film crossover dielectric 29.

Through holes 30—30 are provided in the substrate 21 to facilitate the attachment of external leads to the pads 23—23.

The substrate 21, in addition to being electrically nonconductive, as noted above, should also be thermally conductive and be able to withstand the firing temperatures encountered during formation of the thick-film portions of the circuit. While there are many materials meeting these requirements, some examples of especially suitable materials are: alumina and berylia ceramics. Glass may also be used with suitable low firing-temperature glazes.

The conductors 22—22, the pads 23—23 and the crossover conductor 26 are composed preferably of conductive glazes; that is, metallic particles dispersed in a glass matrix. Their thicknesses generally range from .20 to 2.0 mils.

The metallic or conductive constituent(s) of the conductors 22—22 and 26 is selected in accordance with desired circuit performance characteristics. For example, where very highly conductive circuit interconnections are required, a very high conductivity metal, such as gold, is preferably chosen as the sole conductive constituent of the conductors 22—22 and 26.

The conductive constituent(s) of the pads 23–23 is primarily selected in accordance with the requirements of the lead attachment technique to be employed. Thus, for example, where the leads are to be attached by soldering, a solderable composition, such as platinum-gold, is employed as the conductive constituent of the pads 23—23.

The compositions of the glass matrices of the conductors 22—22, the pads 23—23 and the crossover conductor 26 are selected so as to be compatible with each other and with the other materials employed in the circuit. In addition, the glass constituents of the conductors 22—22 and the pads 23—23 must be compatible with subsequent processing steps. For example, where the resistors 24—24 are to be formed by area film deposition and selective etching, the glass matrices must be resistant to the etchant employed. In the case, therefore, where the etchant employed is one which normally attacks glass, such as an etchant containing fluoride ions, the glass must have fluoride etch resistant characteristics.

The resistors 24—24 and the crossover resistor 28 are composed of a thin-film of a vacuum deposited resistive material. The thickness of the film is usually between 800 and 2000 A. Advantageously, the material is one which is anodizable to enable subsequent trimming of the resistors 24—24 and 28 to precise values by anodization, as disclosed in U.S. Pat. 3,148,129, issued Sept. 8, 1964 to H. Basseches et al. Preferably, as disclosed in U.S. Pat. 3,242,006, issued Mar. 22, 1966 to D. Gerstenberg, the material is tantalum and/or tantalum nitride which as been found to form very stable and reliable resistors.

The crossover dielectrics 27 and 29 are preferably glazes whose primary properties are: low dielectric constant, high dielectric strength, low leakage and low dissipation factor. Such properties aid in minimizing capacitive coupling between crossing paths. The dielectrics are also made relatively thick (between .5 and 5.0 mils) for the same purpose. Additionally, where the resistors 24—24 and 28 are to be formed by area film deposition and selective etching, the dielectric 27 and 29 should be resistant to the etchant employed.

Figure 2:
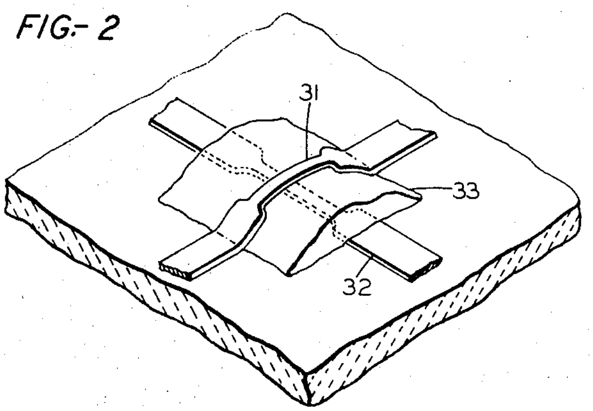
FIG. 2 illustrates a modification which can be incorporated in the circuit of FIG. 1.

Capacitance between a pair of crossing paths may be further reduced by necking down one or both paths in the crossing area, as seen in FIG. 2, where the reference numerals 31 and 32 designate a pair of crossing conductors and the reference numeral 33 designate the crossover dielectric. Necking down the conductors 31 and 32 only in the crossing area has the advantage of effecting a substantial reduction in capacitance between the conductors without effecting any significant increase in the resistance of the conductors.

Further details of the circuit 20 will appear in the course of the following description of its method of fabrication.

METHOD OF FABRICATION

Figure 3:
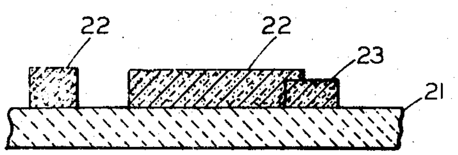

The first step in fabricating the circuit 20 is to form the thick-film conductor network. This is accomplished by selectively applying the constituents of the conductors 22—22 and the pads 23—23, in frit form, onto the substrate 21. Advantageously, this is done by a conventional screening technique. Where the conductors 22—22 and the pads 23—23 are of the same composition, the screening is accomplished in one step. Where they are of different compositions, the screening is accomplished in two steps: the pads 23—23 generally being screened first and the conductors 22—22 second, such that the conductors overlap their respective pads, as seen in FIG. 3. As is conventional, the frits contain conductive particles, glass-forming oxides an organic binder and an organic vehicle.

Figure 4:
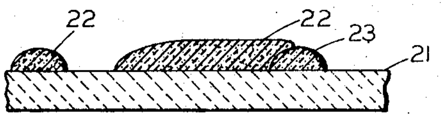

After screening, the substrate 21 of FIG. 2 is fired at a temperature sufficient to glaze the frits and bond them to each other and the substrate. The resultant structure is shown in FIG. 4. As seen from a comparison of FIGS. 3 and 4, the glazing is such as to round the initially squared-off edges of the conductors 22—22 and the pads 23—23. This phenomenon, which is a typical result of firing frit compositions, is believed to be due to wetting, surface tension and shrinkage. The significance of the rounding phenomenon is to enable formation of a strong, continuous resistive film over the conductors 22—22, as will be discussed more fully below.

Figure 5:
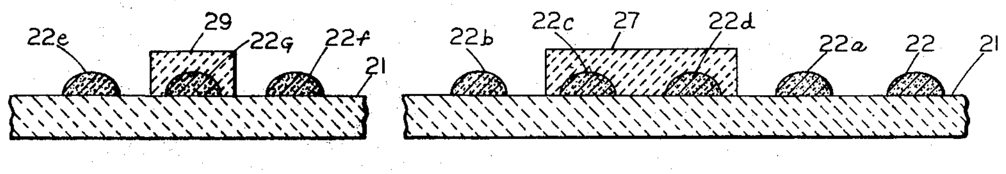

The next step in the method is the formation of the crossover dielectrics 27 and 29. Like the conductors 22—22 and the pads 23—23, the dielectrics 27 and 29 are advantageously formed by screening their constituents, in frit form, onto their respective underlying conductors 22—22 and selected portions of the substrate 21. The screening is such that, as seen in FIGS. 1 and 5, the dielectric 27 forms an electrically insulative bridge or crossover path over the conductors 22*c* and 22*d*, and the dielectric 29 forms a similar path over the conductor 22*g*. The frit mixture is formed of glass-forming oxides and a suitable organic binder and vehicle. In order to reduce the likelihood of an alignment of occluded gas bubbles which could cause subsequent failure of the dielectrics, the screening may be effected in two steps such that approximately half the thickness of each dielectric is put down during each step.

Figure 6:
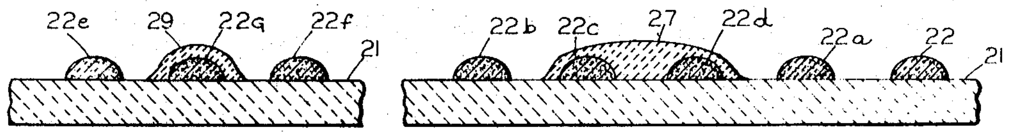

After screening, the substrate 21 is fired to glaze the dielectrics 27 and 29 and bond them to their respective underlying conductors 22—22 and to the substrate 21. As seen in FIG. 6, the effect of this firing step, like the previous firing step, is to impart a somewhat rounded configuration to the dielectrics 27 and 29.

Figure 7:
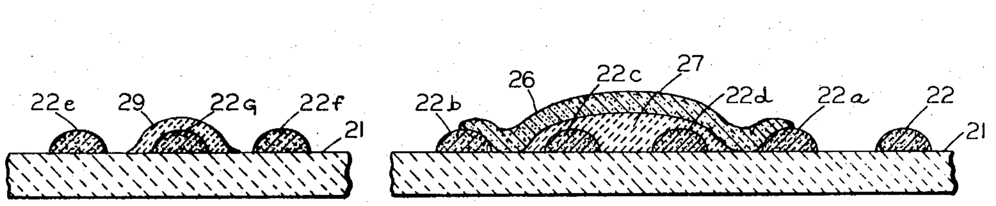

After formation of the crossover dilectrics 27 and 29, a frit formulation for the crossover conductor 26 is screened on over the crossover dielectric 27 such as to connect the conductors 22*a* and 22*b*. The substrate 21 is then fired to glaze the conductor 26 and bond it to the crossover dielectric 27, the substrate 21 and the conductors 22*a* and 22*b* (FIGS. 1 and 7). It is preferable, though not necessary to fire this conductor 26 at a temperature lower than the softening or gloss point of the dielectric 27, so that the conductor 26 does not settle into the dielectric and thereby effect an increase in capacitance between the conductor 26 and the underlying conductors 22*g* and 22*d*.

This last step completes the fabrication of the thick-film portions of the circuit 20. It should be noted, at this point, that although the thick-film portions have been described as being fabricated by separate firing steps, they could alternatively be fabricated wtih just one or two firing steps (e.g., by combining the firing of the dielectric and the crossover conductor).

The next step in the process is the formation of the resistors 24—24 and the crossover resistor 28. One way of accomplishing this is to vacuum deposit a thin film of the electrical component-forming material through a suitable mask. Advantageously, however, the material is vacuum deposited as an area film over the entire surface of the substrate which is then selectively etched to form the resistors 24—24 and 28. The term "vacuum deposition" as used herein is meant to include evaporation, sputtering and other equivalent "condensation" techniques.

Figure 8:
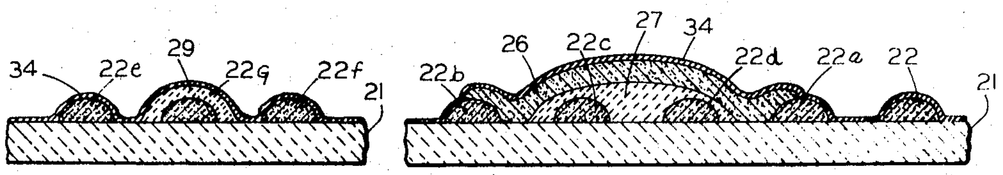

The resultant structure after deposition is shown in FIG. 8, where the reference numeral 34 designates the deposited thin film. It should be noted that the thin-film 34 closely follows the topology of the dielectric 29 and the conductors 22—22 and forms a continuous film of relatively uniform thickness. This is made possible by the rounded cross-sectional configuration of the dielectric 29 and the conductors 22—22, which enables the film to accommodate itself to the dielectric and the conductors even though the film must figuratively climb mountains; that is, the thicknesses of the conductors are of the order of .4 mil and that of the dielectric of the order of 2 mils, while the film thickness is of the order of 1200 A. (0.0047 mil).

This aspect of the invention will be better appreciated by referring to FIGS. 11*a* and 11*b* which illustrate the vacuum deposition of a thin film 36 over a relatively thick, squared-off element 37 formed on a substrate 38, and FIGS. 12*a* and 12*b* which illustrate the vacuum deposition of a thin film 39 over a rounded element 41 formed on a substrate 42 and of the same thickness as the element 37.

In vacuum deposition processes, such as sputtering, the particles of material are deposited in random directions. This has been represented in FIG. 11*a* by three sets of rays 43—43, 44—44, and 46—46; the set 43—43 being directed toward the substrate 38 at an angle from the left, the set 44—44 being directed downwardly toward the substrate, and the set 46—46 being directed toward the substrate at an angle from the right. Similarly, the directions of material deposition on the substrate 42 have been represented by three sets of rays 47—47, 48—48 and 49—49.

Referring now to FIG. 11, it is seen that, because of the steepness of the sides 51 and 52 of the element 37, only the rays 43—43 from the left impinge upon the left side 51 of the element, while only the rays 46—46 from the right impinge upon the right side 52 of the element. Rays from all three sets impinge upon the top 53 of the element 37 and on the substrate portions to the left and the right of the element. This unequal "bombardment," as seen in FIG. 11*b*, results in an unevenly deposited film 36, the effect of which may be discontinuities 54—54 at the junctures of the element 37 with the substrate 38, and thin spots 56—56 along the sidewalls 51 and 52. Discontinunities, of course, would render the film 36 fatally defective. Thin spots, on the other hand, could lead, in use of the circuit, to hot spots and resultant burnout.

Turning now ot FIG. 12*a*, it is seen that because of the rounded configuration of the element 41 each portion of the element is struck by rays from each set of rays. This relatively equal bombardment results in the relatively uniform, continuous film 39, shown in FIG. 12*b*.

Additional details on sputtering and other vacuum deposition process may be had by referring to the above mentioned Gerstenberg patent and to L. Holland, "Vacuum Deposition of Thin Film," J. Wiley and Sons, New York, 1956.

Figure 9:
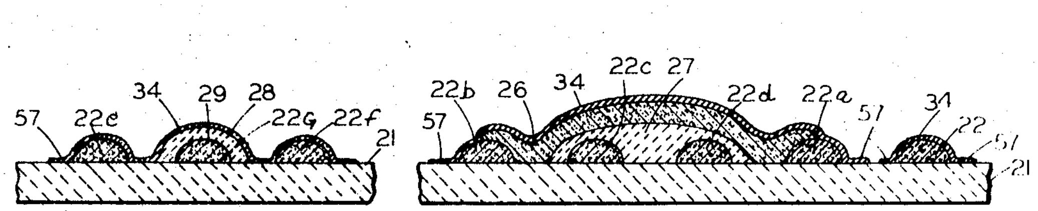

After deposition of the film 34, the portions of the film 34 which are to serve as the resistors 24—24 and the crossover resistor 28 are masked with an etch-resistant material. In the case where the film 34 is composed of an electrical film-forming material which is not attacked by solutions and/or atmospheres which would attack the conductors 22—22 and 26, as where the film material is tantalum nitride and the conductive constituent of the conductors is gold, this invention contemplates also masking the conductors to leave a protective covering of the film material over the exposed surfaces of the conductors. Additionally, where the film material is deposited by a technique, such as sputtering, which causes the film 34 to adhere to the substrate 21 with a bond stronger than that between the conductors 22—22 and the substrate, this invention in accordance with another aspect thereof contemplates masking the conductors on either side thereof to provide, after etching, tabs 57—57 (FIG. 9) which more firmly secure the conductors to the substrate.

The masking may be accomplished by any suitable conventional technique. For example, the etch resistant material may be screened on or, advantageously, it may be applied by a photolithographic process which comprises coating the entire surface of the film 34 with a photoresist material, and then exposing those areas of the coated film which are to be masked to light. The coated film is then subjected to a photographic development process which renders the exposed areas of the photoresist etch resistant and removes the photoresist from the unexposed areas, uncovering the underlying film 34.

Next, the masked film is subjected to an etchant which attacks and removes the uncovered film 34 but does not attack the protected film portions. This results in the structure shown in FIGS. 1 and 9: in FIG. 9, the film 34 being shown as being left on the conductors, as well as on either side thereof to provide both protection and locking, while in FIG. 1 it is shown as only forming the resistors 24—24 and 28. In the case where the film 34 is composed of tantalum nitride, either hot sodium hydroxide (NaOH) or a mixture of nitric and hydrofluoric acids ($HNO_3$-HF) is used as the etchant. Since NaOH does not attack the usual glaze constituents, no special precautions are necessary when using NaOH as the etchant. Acids containing fluoride ions, however, do normally attack glass and, accordingly, if it is desired to use the $HNO_3$-HF mixture as an etchant, the glaze, as previously noted, should have fluoride resistant characteristics.

After etching, the resistors 24—24 and 28 are trim anodized to value, as disclosed in the above-mentioned Basseches et al. patent.

Active components, such as transistors 58—58 (FIG. 10) may now be attached to the circuit 20. This may be accomplished by inserting the leads 59—59 of the components through the holes 30—30 and into contact with respective pads 23—23. Then, as seen in FIG. 10, the circuit 20 may be subjected to a mass soldering operation, such as wave soldering, to attach the components to the circuit.

It is to be understood that although the foregoing description, insofar as thin-film components are concerned, only discloses the formation of thin-film resistors, this invention also contemplates the formation of thin-film capacitors, such as those disclosed in U.S. Pat. 2,993,266, issued July 25, 1961 to R. W. Berry.

The invention will be further illustrated by the following detailed example, in which the stated percentages are by weight:

EXAMPLE

The frit mixture for the pads 23—23 comprised 15% platinum, 55% gold, 10% ethyl cellulose, 10% butyl cellusolve acetate and 10% of a mixture of glass-forming oxides, such as lead oxide (PbO), bismuth oxide ($Bi_2O_3$) and titanium dioxide ($TiO_2$). This mixture was squeegeed through a screen of 325 mesh onto an unglazed, high alumina (99% $Al_2O_3$) substrate to form pads having a thickness of about .35 mil. The frit mixture for the conductors 22—22 was then squeegeed through a screen of 325 mesh to form conductors about 0.35 mil thick. The frit mixture employed for the conductors had the same composition as that employed for the pads, except 70% gold was used instead of 15% platinum and 55% gold. Both frit patterns were then fired at a temperature of 1000° C. for 75 seconds.

A frit mixture for the dielectrics 27 and 29 was then squeegeed through a screen of 180 mesh to form dielectrics about 1.6 mils thick. The frit mixture comprised 32% silicon dioxide ($SiO_2$), 14% barium oxide (BaO), 20% lead oxide (PbO), 2% aluminum oxide ($Al_2O_3$), 5% calcium oxide (CaO), 5% boron oxide ($B_2O_3$), 1% potassium oxide ($K_2O$), 1% sodium oxide ($Na_2O$), 2% ethyl cellulose, 10% $\alpha$ terpineol, 5% $\beta$ terpineol, 1% terpene hydrocarbons, and 2% of other tertiary alcohols boiling in the $\alpha$ terpineol range. This frit was then fired at a temperature of 1000° C. for 5 minutes.

A frit mixture for the crossover conductor 26 was then squeegeed through a screen of 325 mesh to form a crossover conductor .35 mil thick. The frit mixture employed was the same as that employed to form the conductors 22—22. The crossover conductor was then fired at a temperature of 750° C. for 3 minutes.

A film of tantalum nitride was then deposited on the substrate to a thickness of 1200 A. by a reactive, cathodic sputtering process, similar to that disclosed in the aforementioned Gerstenberg patent. The film was then masked using a conventional photolithographic process and etched using an etchant comprising one part HF, one part $HNO_3$ and two parts $H_2O$. Thereafter, the resistors were trim anodized and external components were wave soldered to the circuit, as noted above.

It is to be understood that the above-described embodiments are merely illustrative of the principles of the invention. Various other embodiments may be readily devised by those skilled in the art which will embody these principles and fall within the spirit and scope thereof.

What is claimed is:

1. A combined thick and thin film circuit, which comprises:

(a) an electrically nonconductive substrate;

(b) at least first, second and third glazed conductive elements bonded to the substrate and arranged such that the first element is disposed intermediate the second and third elements;

(c) a layer of nonconductive glaze bonded to at least a part of the first element to provide a crossover path electrically insulated from the first element; and (d) a thin film resistor bonded to the glaze layer along the crossover path and extending from opposite ends of the path to and in contact with the second and third elements .

2. A circuit as recited in claim 1, wherein:

the layer of nonconductive glaze comprises a bottom surface bonded to the substrate and a top surface connected to the bottom surface by a pair of opposed sidewalls, each of which extends upwardly from the bottom surface and converges toward the other sidewall; and the resistor comprises a thin continuous resistive film which extends from the second element to and up one of the opposed sidewalls of the glaze layer, then over the top surface of the glaze layer to and down the other opposed sidewall and then to the third element.

3. A circuit as defined in claim 2, wherein:

the resistive film at least partially overlies each element and extends from two opposed sides thereof onto the substrate, the film being bonded to the substrate with a bond which is stronger than the bond between each element and the substrate to thereby more firmly secure each element to the substrate.

4. A circuit as defined in claim 2, wherein:

the resistive film covers the exposed surfaces of the conductive elements to protect such elements.

5. A circuit as defined in claim 4, wherein:

the conductive constituent of the elements consists essentially of gold and the film material is selected from the group consisting of tantalum and tantalum nitride.

6. A circuit as defined in claim 5, wherein:

the thickness of the glaze layer is between .5 and 5.0 mills and the thickness of the film is between 800 and 2000 A.

7. A circuit as defined in claim 5, further including a glazed conductive pad bonded to one of the elements and the substrate and to which external leads may be attached, the conductive constituent of the pad comprising platinum and gold.

8. In a combined thick and thin film circuit:

(a) an electrically nonconductive substrate;

(b) at least one glazed conductive element bonded to the substrate; and (c) a protective covering of a thin film of electrical resistive material on and bonded to at least all of the top surface of the element and extending therefrom onto the substrate with a bond to the substrate that is stronger than the glazed conductive element bond to protect the electrical and physical integrity of the element and more firmly secure the conductive element to the substrate.

9. A circuit as defined in claim 8, wherein the conductive constituent of the element consists essentially of gold, and the film material is selected from the group consisting of tantalum and tantalum nitride.

10. A combined thick and thin-film circuit, which comprises:

(a) an electrically nonconductive substrate;

(b) at least first, second and third glazed conductive elements bonded to the substrate;

(c) a layer of nonconductive glaze over at least a part of the first element;

(d) a glazed conductive crossover element bonded to the nonconductive glaze layer in crossed, spaced relationship to the first element, the crossover element being connected at one end to the second element, and being connected at its opposite end to the third element; and (e) a thin film of resistive material overlying all of the top surfaces of the crossover element and the first, second and third elements, the film extending onto the substrate from at least one of the first, second and third elements in the form of a thin-film resistor, the material being resistant to atmospheres and solutions which would adversely affect the electrical and physical integrity of the elements, thereby protecting such elements.

11. A circuit as recited in claim 10, wherein the conductive constituent of each of the first, second and third elements and the crossover element consists essentially of gold and the film material is selected from the group consisting of tantalum and tantalum nitride.

12. A circuit as recited in claim 11, wherein the width of either the first element or the crossover element in the crossing area is narrower than the width of that element at its ends, so as to reduce the surface area of said element capacitively presented to the other crossed element and thereby reduce the capacitance between the crossed elements.

13. A circuit as recited in claim 12, wherein the width of the other of the crossed elements in the crossing area is narrower than the width of said other crossed element at its end, to thereby effect a further reduction in capacitance between the crossed elements.

14. In a method of fabricating a combined thick and thin-film circuit, the steps of:

(a) applying a conductive frit to an electrically nonconductive substrate to form a conductive frit pattern including at least first, second and third conductive frit elements arranged such that the first element is disposed intermediate the second and third elements;

(b) heating the three elements and the substrate to a temperature sufficient to glaze the elements and to bond the elements to the substrate;

(c) applying a layer of a nonconductive frit to at least parts of the first element and the substrate to form a nonconductive bridge over the first element;

(d) heating the nonconductive frit layer, the first element and the substrate to a temperature sufficient to glaze the layer and bond it to the first element and the substrate, the glazing being such as to cause two opposed sidewalls of the layer to converge toward each other such that the distance between the sidewalls at the bottom of the layer is greater than the distance between them at the top of the layer; and (e) vacuum depositing a thin film of a resistive material onto the glazed elements, the glaze layer and the substrate, the converging of the layer sidewalls enabling a continuous film of the material of substantially uniform thickness to extend from the second glazed element to and up one of the sidewalls of the glaze layer, then over the top thereof to and down the other opposed sidewall and then to the third glazed element.

15. The method recited in claim 14, wherein:

the film is deposited as an area film over the entire substrate thereby completely covering the elements, the glaze layer and the substrate; and further including the step of:

selectively removing portions of the film from the substrate and the glaze layer, while leaving the film on the top surfaces of the elements, to form a protective covering over the elements and a thin film resistor extending from the second element to and over the glaze layer to the third element.

16. The method recited in claim 15, wherein the conductive constituent of each of the elements consists essentially of gold, and the film material is selected from the group consisting of tantalum and tantalum nitride.

17. The method recited in claim 15, wherein:

the film is deposited by sputtering and the sputtering is such that the film is bonded to the substrate with a bond which is stronger than the bond between each element and the substrate; and the film removal step is carried out such that the film is left on each element such that it extends from two opposed sides thereof onto the substrate, to thereby more firmly secure each element to the substrate.

18. The method recited in claim 17, wherein the conductive frit is applied to the substrate by screening.

19. The method recited in claim 14, wherein the film is deposited by sputtering.

20. The method recited in claim 19, wherein the thickness of the glaze layer is between .5 and 5.0 mils and the thickness of the film is between 800 and 2000 A.

21. In a method of fabricating a combined thick and thin-film circuit, the steps of:

(a) applying a conductive frit to an electrically nonconductive substrate to form at least one conductive element;

(b) heating the element and the substrate to a temperature sufficient to glaze the element and bond it to the substrate; and (c) sputtering a protective covering of a thin film of electrical resistive material on the element and the substrate such that the film covers at least all of the top surface of the element and extends therefrom onto the substrate, with a bond that is stronger than the glaze bond between the element and the substrate to more firmly secure the element to the substrate and form a protective covering that is resistant to atmospheres and solutions which would adversely affect the electrical and physical integrity of the element.

22. The method recited in claim 21, wherein the conductive constituent of the element consists essentially of gold and the film material is selected from the group consisting of tantalum and tantalum nitride.

23. The method recited in claim 22 further including before step (c) the steps of:

applying a conductive frit to the substrate to form a second conductive element, the conductive constituent of the second element comprising platinum and gold; and heating the second element and the substrate to a temperature sufficient to glaze the element and bond it to the substrate; and said method further including after step (c) the step of wave soldering a lead to the second element, the film atop the first mentioned element preventing the solder from attacking this element.

24. The method of fabricating a combined thick and thin-film circuit, which comprises the steps of:

(a) applying a conductive frit to an electrically nonconductive substrate to form a conductive frit pattern including at least first, second and third conductive frit elements arranged such that the first element is intermediate the second and third elements;

(b) heating the three elements and the substrate to a temperature sufficient to glaze the elements and to bond the elements to the substrate;

(c) applying a layer of nonconductive frit to at least parts of the first element and the substrate to form a nonconductive bridge over the first element;

(d) heating the nonconductive frit layer, the first element and the substrate to a temperature sufficient to glaze the layer and bond it to the first element and the substrate;

(e) applying a conductive frit to at least a part of the nonconductive layer and to at least parts of the second and third elements, to form a crossover conductive frit element which crosses over the first element and is connected at its ends to the second and third elements, the nonconductive layer electrically insulating the crossover element from the first element;

(f) heating the crossover element, the nonconductive layer and the second and third elements to a temperature sufficient to glaze the crossover element and bond it to the nonconductive layer and the second and third elements;

(g) vacuum depositing an area thin film of resistive material onto the glazed first, second and third elements, the glazed crossover element and the substrate; and (h) selectively removing the film from portions of the substrate and the nonconductive bridge, while leaving it on the first, second and third elements and the crossover element, to provide a protective covering over the first, second and third elements and the crossover element and to form at least one thin-film resistor extending from one of the first, second and third elements onto the substrate, the material being resistant to atmospheres and solutions which would adversely affect the physical and electrical integrity of the elements.

25. The method recited in claim 24, wherein the conductive constituent of each of the first, second and third elements and the crossover element consists essentially of gold, and the film material is selected from the group consisting of tantalum and tantalum nitride.

References Cited

UNITED STATES PATENTS

| | | | |
|---|---|---|---|
| 3,374,110 | 3/1968 | Miller | 117—212 |
| 3,317,653 | 5/1967 | Layer et al. | 117—215X |
| 3,242,006 | 3/1966 | Gerstenberg | 117—106X |

ALFRED L. LEAVITT, Primary Examiner

A. GRIMALDI, Assistant Examiner

U.S. Cl. X.R.

29—625, 628; 117—215; 174—68.5; 204—197; 317—101